(No Model.)

H. DRYSDALE.
TURRET HEAD LATHE.

No. 437,292. Patented Sept. 30, 1890.

Witnesses:
W. A. Wolf
George Kenny

Inventor:
Hugh Drysdale

UNITED STATES PATENT OFFICE.

HUGH DRYSDALE, OF CLEVELAND, OHIO.

TURRET-HEAD LATHE.

SPECIFICATION forming part of Letters Patent No. 437,292, dated September 30, 1890.

Application filed September 8, 1888. Serial No. 284,963. (No model.)

*To all whom it may concern:*

Be it known that I, HUGH DRYSDALE, a citizen of the United States, residing at Cleveland, in the county of Cuyahoga and State of Ohio, have invented new and useful Cam-Turning Attachments to Turret-Lathes, of which the following is a specification.

My invention relates to improvements in turret-lathes in which a revolving spindle carrying a chuck operates in conjunction with a transverse cut-off carriage and rotating turret; and the objects of my improvements are to provide certain attachments to the spindle and frame-work of an ordinary turret-lathe, by means of which cams and other analogous forms of irregular shape may be readily turned in such lathe. I attain these objects by the mechanism set forth in the accompanying drawings, in which—

Figure 1:
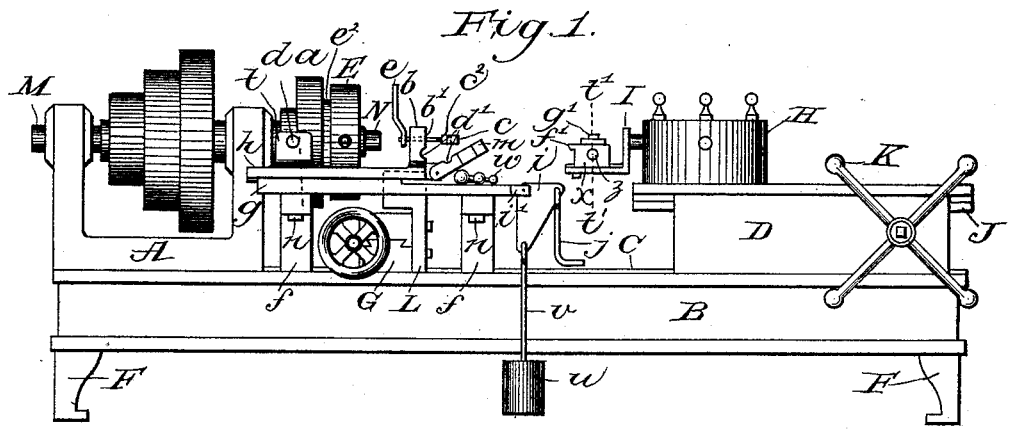
Figure 2:
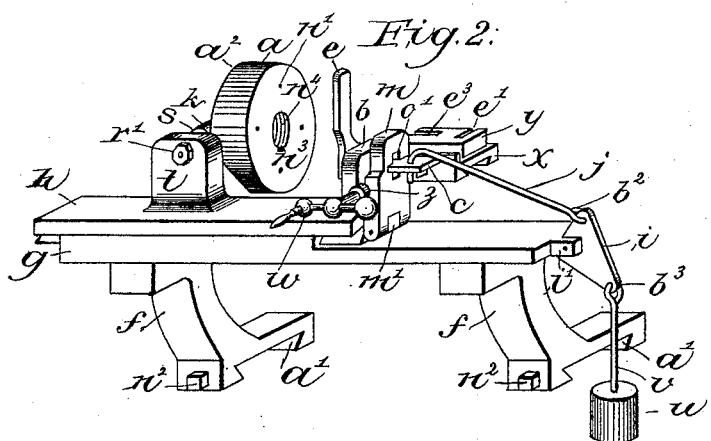
Figures 3, 4, 5:
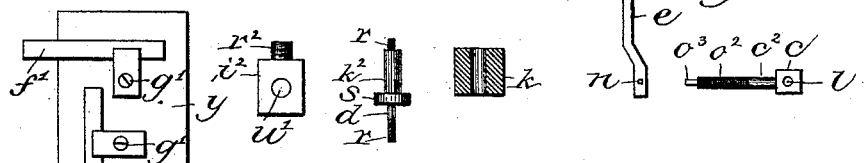
Figure 6:
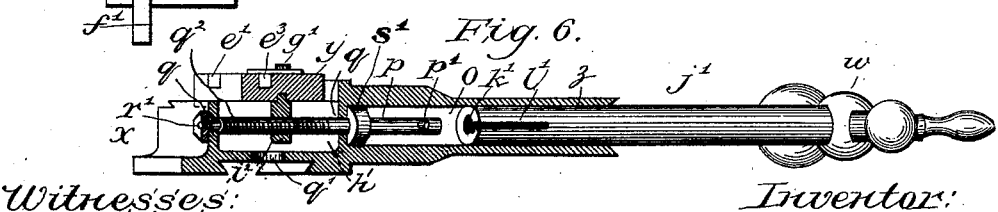

Figure 1 is a vertical side view of the entire machine. Fig. 2 is a view in perspective of the parts comprising the attachments. Figs. 3, 4, and 5 are detail views of detached parts of the invention, and Fig. 6 is a vertical transverse section of the slide-carriage and tool-block.

Similar letters refer to similar parts throughout the several views.

The main frame B, its legs F F, V-shaped edges C, head-stock A, cone and spindle M, having chuck E, a turret-elevation block D, hand-reel K, to operate the slide-carriage J and rotate the turret H, a tool-body I, a transverse cut-off carriage and block G, and a tool-body rest L, secured to said block G, constitute an ordinary turret-lathe.

To the V-shaped edges C of the main frame B are attached two laterally-projecting brackets $ff$, that are secured to said edges—one on each side of the cut-off carriage and block G—by means of corresponding V-shaped guides $a'\,a'$. Said brackets are held in place on the V-shaped edges C by set-screws $n^2\,n^2$ (see Fig. 2) and sustain a longitudinal support $g$, that is secured on the top and at the outer ends of the said brackets by screws $n\,n$, passing through said brackets to the under side of the said support $g$. (See Fig. 1.) Said support $g$ has an end extension $i'$, that is slotted and supplied with a knuckle $i$, fulcrumed in said extension $i'$. A weight $w$ and hook $j$ are linked to said knuckle $i$ at $b^2$. On the opposite portion of said support $g$ is arranged a fixed dovetailed recess, which serves to guide a correspondingly-dovetailed slide-plate $h$, that has an inner end extension $m'$, to which is hinged a clamp-piece $m$, that has a hollowed-out receptacle $d'$ transversely on its face, and a slot $o'$ is formed through it near the top. Said piece $m$, when not in use, drops down on said support $g$; also, on the same end of said slide-plate $h$ is an upright extension $b$, that has a hollowed-out receptacle $d'$, transversely on its face, and a threaded hole $b'$, longitudinally through it near the top. Said hole is provided with a correspondingly-threaded bolt $c^2$, that projects through on each side of said upright extension $b$, and has on one end a handle $e$, secured to the slabbed surface $o^3$ by a set-screw $n$, (see Fig. 5,) and is to revolve said bolt $c^2$ in said threaded hole $b'$, so as to move it endwise in said upright extension $b$. The opposite end of said bolt $c^2$ has a flat extension-shoulder $c$, that extends through the slot $o'$ when the clamp-piece $m$ is raised to a vertical position by the hand. The handle $e$, when turned a quarter-turn, crowds said shoulder $c$ over the edge of the slot $o'$, (see Fig. 2,) and thus securely clamps said piece $m$ to said upright extension $b$, the clamping of which piece $m$ securely binds in the receptacles $d'$ a shank-extension $z$ of a slide-carriage $x$, that is independently arranged on a tool-body I in the rotating turret H, referred to hereinafter. Said flat extension-shoulder $c$ has a hole $l$ through it to engage the hook $j$ after said piece $m$ is clamped, as described. This hook couples said slide-plate $h$ to the knuckle-joint $i$ and to the weight $u$ on support $g$. On the top and opposite end of said slide-plate $h$ is provided an upright extension $t$, provided with an inwardly-projecting stud $d$, secured by means of a shoulder-extension $s$, and draw-nut $r'$ in said extension $t$, and carrying an anti-friction roller $k$ that forms the contact-connection of said slide-plate $h$ to the curvature face $a^2$. This face is a pattern of any desired circumferential development of the cam or irregular shape to be produced. This face is on an actuating-cam $a$, that is permanently secured to the back of the chuck E by screws passing through the holes $n'$, or it may be secured to the lathe-spindle by a threaded arbor-hole $n^4$, or a key and seat, as at $n^3$. Said cam revolves with the spindle M, and it moves forward said slide-plate $h$ and its engaged slide-carriage $x$ through a space on said support $g$ and tool-body I equal to the curvature development given to the pattern-face $a^2$ of the cam $a$. Said plate and carriage are drawn back by said suspended weight $u$. Thus are the slide-plate $h$ and slide-carriage $x$ longitudinally reciprocated.

On the tool-body I in the turret H is arranged a fixed dovetailed guide-plate, which serves to guide a correspondingly-recessed base-plate of a reciprocating slide-carriage $x$ that has a fixed dove tailed guide-plate transversely on its top, which serves to guide a correspondingly-recessed base-plate of a tool-block $y$. A vertical transverse section view of said carriage and tool-block, taken on the dotted line $t\ t$ of Fig. 1, is shown in Fig. 6.

The carriage $x$ has a laterally-projecting shank-extension $z$ that corresponds to the receptacle $d'$ on the slide-plate $h$, and in the said receptacle said carriage $x$ by said shank $z$ is engaged and secured, and said carriage is thus longitudinally reciprocated on said tool-body I in conjunction with said slide-plate $h$ by means of cam $a$, as before described, the tool-body I meanwhile remaining at rest in the rest L. Said carriage $x$ when not in use is released from said receptacle $d'$ by lifting the hook $j$ from the hole $l$, and turning the handle $e$ a quarter-turn back, when the piece $m$ drops down on said support $g$. The carriage $x$ may be then independently drawn back with the turret H by turning the reel K, when said carriage may be rotated with the turret in the usual way. The said carriage $x$ has let into its top a rectangular receptacle $h'$, and a hollow $o$ is formed in the said shank $z$. A feed-screw $q^2$ is secured in apertures in the walls $q\ q$ of said receptacle $h'$ by means of a shoulder-extension $s'$ and jam-nut $r'$. (See Fig. 6.) Said screw has an end extension P, bearing a lock-pin P', projecting into the hollow $o$ of said shank, and adapted to enter a corresponding hollow K' and slot $l'$ in the end of an arm $j'$ that has on its opposite end a handle $w$, secured on a shoulder by a key and seat. Said feed-screw $q^2$ and arm $j'$ are made separate with coupling devices, as described, in order that said arm $j'$ may be withdrawn from the hollow $o$ to afford clearance to said carriage $x$, so that it may be independently turned around with the turret as aforementioned.

The tool-block $y$ aforementioned has a longitudinally-arranged groove $e'$ in its top, with a knife $f'$ in said groove having a cutting-edge on its projecting end with which to turn curvature, cam, or other irregular faces, corresponding to the pattern-face $a^2$. A similar groove and knife is transversely arranged on said tool-block $y$, the knife having a cutting-edge on its projecting end with which to turn groove-cams similar to the pattern-face $a^2$, the knives to be used individually.

To the under side of the tool-block $y$ is secured a feed-nut $i^2$ that is let into the receptacle $h'$ through the opening $q'$. It has a threaded extension $r^2$ that is screwed into said tool-block, and it is engaged to the feed-screw $q^2$ by means of the threaded hole $u'$. The revolving of said screw by the handle $w$ operates to move said tool-block $y$ transversely on said carriage $x$ to or from the bar metal in conjunction with the longitudinal reciprocation of said carriage $x$ and slide-plate $h$, as aforedescribed, the respective knife in use meanwhile imparting to the bar metal that is held in the chuck E a face or groove that is an exact counterpart of the pattern-face $a^2$. Further, the cam-face or groove, of irregular shape and similar to the pattern, being turned as thus described, the carriage $x$ is released from the slide-plate $h$ and is turned about with the turret H, as aforedescribed, so that each cam or irregular shape produced may be operated upon by any other desired tools in the turret before cutting the cam from the stock, which is done in the ordinary way with the cut-off tool in the carriage G.

Having thus described my invention, I claim as new and desire to secure by Letters Patent—

The combination, in a turret-lathe, of a longitudinal support $g$, a slide-plate $h$, mounted therein, a cam on the lathe-spindle actuating said plate in one direction, a weight and connections tending to move said plate in the opposite direction and hold the same in contact with the cam-face, a slide-carriage $x$, mounted on a turret-tool body I, and having a shank adapted to be clamped to the slide-plate, and a tool-block slidably mounted on the carriage and having suitable cutting-tools, substantially as described, whereby when the lathe-spindle is rotated the tools are moved lengthwise of the lathe-bed.

HUGH DRYSDALE.

Attest:
D. H. LEWIS,
W. A. WOLF.